United States Patent
Milne et al.

(10) Patent No.: US 12,263,409 B2
(45) Date of Patent: Apr. 1, 2025

(54) SUPER-FUNGIBLE TOKENS FOR GAMING

(71) Applicants: SONY GROUP CORPORATION, Tokyo (JP); SONY INTERACTIVE ENTERTAINMENT LLC, San Mateo, CA (US)

(72) Inventors: James R Milne, Ramona, CA (US); True Xiong, San Diego, CA (US); Charles McCoy, San Diego, CA (US)

(73) Assignees: SONY INTERACTIVE ENTERTAINMENT LLC, San Mateo, CA (US); SONY GROUP CORPORATION, Tokyo (JP)

( * ) Notice: Subject to any disclaimer, the term of this patent is extended or adjusted under 35 U.S.C. 154(b) by 407 days.

(21) Appl. No.: 17/894,053

(22) Filed: Aug. 23, 2022

(65) Prior Publication Data

US 2024/0066408 A1    Feb. 29, 2024

(51) Int. Cl.
*A63F 13/73*        (2014.01)

(52) U.S. Cl.
CPC .................................... *A63F 13/73* (2014.09)

(58) Field of Classification Search
CPC ........................................................ A63F 13/73
See application file for complete search history.

(56) References Cited

U.S. PATENT DOCUMENTS

| | | | |
|---|---|---|---|
| 2014/0274245 A1* | 9/2014 | Stickel | A63F 13/65 463/9 |
| 2019/0118094 A1 | 4/2019 | McCoy | |
| 2019/0282906 A1 | 9/2019 | Yong | |
| 2019/0299105 A1 | 10/2019 | Knight | |
| 2020/0005284 A1 | 1/2020 | Vijayan | |
| 2020/0242105 A1 | 7/2020 | Rich et al. | |
| 2022/0118365 A1* | 4/2022 | Thacker | A63F 13/71 |
| 2022/0188930 A1 | 6/2022 | Koch | |
| 2022/0358450 A1* | 11/2022 | Stephens | H04L 9/3213 |
| 2022/0391887 A1 | 12/2022 | Jakobsson | |

(Continued)

FOREIGN PATENT DOCUMENTS

JP      2021-152815 A      9/2021

OTHER PUBLICATIONS

Wikipedia, "Non-fungible token", Sep. 10, 2021, 1-18, 19:05.

(Continued)

*Primary Examiner* — Jay Trent Liddle
(74) *Attorney, Agent, or Firm* — CHIP LAW GROUP

(57) ABSTRACT

An electronic device and a method for implementation of super-fungible tokens for gaming is disclosed. The electronic device tracks a set of gaming assets associated with a player in a gaming application. Metadata associated with the set of gaming assets is received and a super-fungible token is created, based on a storage of the metadata to a distributed ledger associated with the gaming application. The creation of the super-fungible token corresponds to an ownership of a single gaming asset from the set of gaming assets by the player in the gaming application at a time instant. A first user input indicative of a selection of a first gaming asset is received. The selected first gaming asset is enabled and a set of second gaming assets are disabled in the gaming application. The disabled set of second gaming assets correspond to gaming assets other than the enabled first gaming asset.

20 Claims, 5 Drawing Sheets

(56) References Cited

U.S. PATENT DOCUMENTS

| | | | |
|---|---|---|---|
| 2023/0042269 A1* | 2/2023 | Benedetto | A63F 13/80 |
| 2023/0055064 A1* | 2/2023 | Dalmia | G06Q 20/02 |
| 2023/0073545 A1 | 3/2023 | Kurian | |
| 2023/0119838 A1* | 4/2023 | Meyers | A63F 13/35 |
| | | | 463/42 |
| 2023/0125021 A1* | 4/2023 | Meyers | A63F 13/58 |
| | | | 463/31 |
| 2023/0127351 A1* | 4/2023 | Khalfan | A63F 13/352 |
| | | | 463/43 |
| 2023/0162179 A1* | 5/2023 | Deng | G06Q 20/3823 |
| | | | 705/64 |
| 2023/0298435 A1* | 9/2023 | Dalmia | G07F 17/3241 |
| | | | 463/42 |
| 2023/0334493 A1* | 10/2023 | Meyers | G07F 17/3251 |
| 2023/0351369 A1* | 11/2023 | Lee | G06Q 20/3674 |
| 2023/0360045 A1* | 11/2023 | Assenov | A63F 13/792 |
| 2024/0012794 A1* | 1/2024 | Reid | H04L 9/50 |
| 2024/0066402 A1* | 2/2024 | Milne | G06Q 20/065 |
| 2024/0066408 A1* | 2/2024 | Milne | G06Q 20/123 |
| 2024/0139632 A1* | 5/2024 | Khan | G06Q 20/367 |

OTHER PUBLICATIONS

Anonymous, "The Sandbox Whitepaper", The Sandbox, Oct. 29, 2020, XP055965849, Sections 1. 1-3. 2.

Rudytsia, Yehor and Nataliia Bogdanova, "UML Model of the Property Right Distribution Module Using NFT Fractionalization Based on Blockchain Technology", International Science Journal of Engineering & Agriculture, (2022), 98-109, 1(3).

\* cited by examiner

SUPER-FUNGIBLE TOKENS FOR GAMING

CROSS-REFERENCE TO RELATED APPLICATIONS/INCORPORATION BY REFERENCE

This application makes reference to U.S. application Ser. No. 17/893,990, C which was filed on Aug. 23, 2022. This application also makes reference to U.S. application Ser. No. 17/894,036, which was filed on Aug. 23, 2022. The above stated patent applications are hereby incorporated herein by reference in their entirety.

FIELD

Various embodiments of the disclosure relate to super-fungible tokens. More specifically, various embodiments of the disclosure relate to an electronic device and method for implementation of gaming assets as super-fungible tokens in gaming applications.

BACKGROUND

Advancements in gaming technology have led to an increase in use of multiple gaming applications. Typically, a player may earn or buy certain points or gifts such as, items or other gaming assets when the player plays a game. Such gifts and points may be used by the player to play the gaming application. In some cases, the player may earn a set of items and only one item out of the set of items may be used at one time. For example, in a fighting gaming application, the player may earn items such as, an axe, a sword, and a knife. However, the player may use only one of the axe, the sword, or the knife at an instant.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for implementation of super-fungible tokens for gaming applications is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
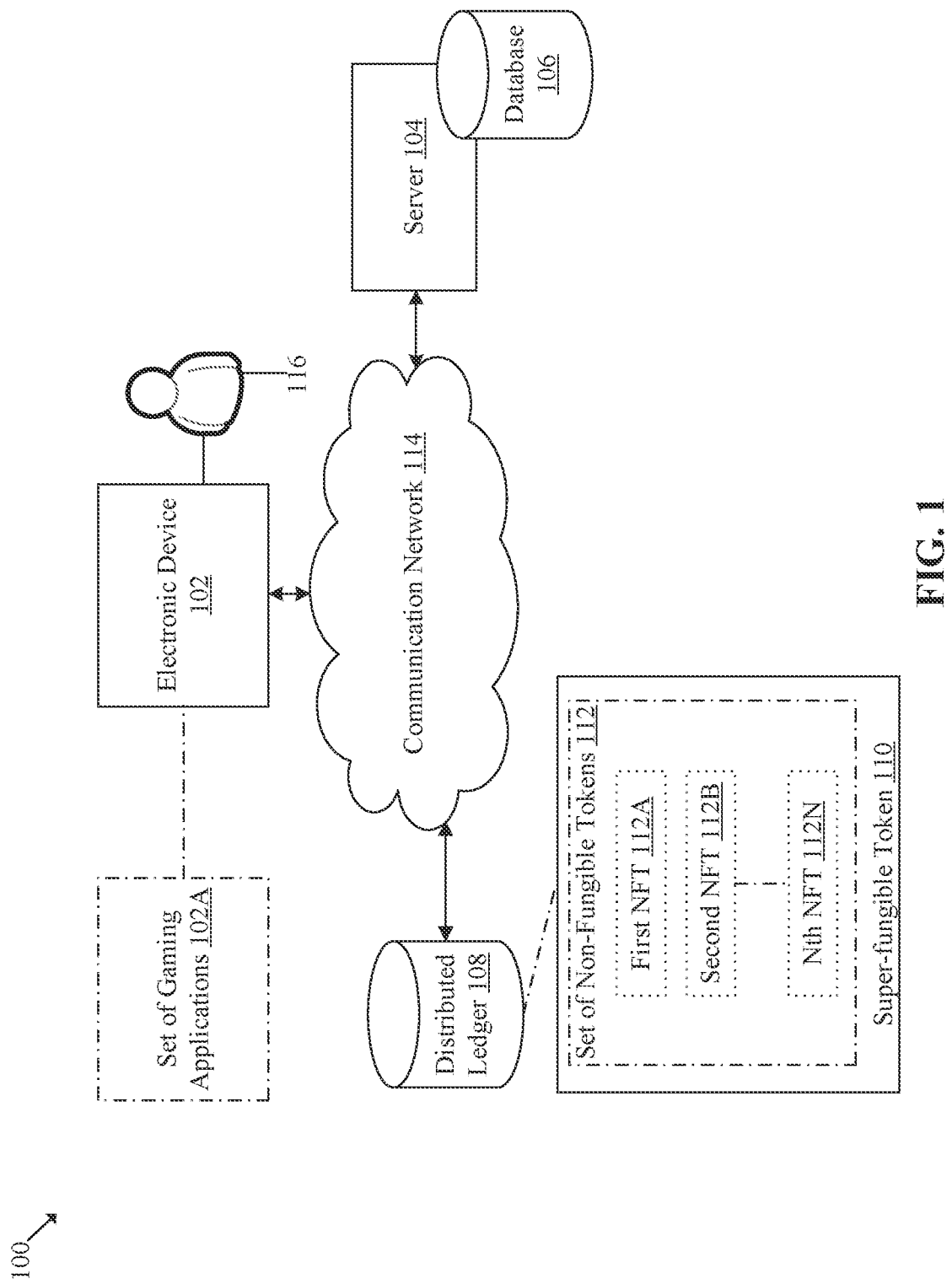
FIG. 1 is a block diagram that illustrates an exemplary network environment for implementation of super-fungible tokens for gaming applications, in accordance with an embodiment of the disclosure.

The following described implementation may be found in the electronic device and method for implementation of super-fungible tokens for gaming. Exemplary aspects of the disclosure may provide an electronic device that may implement super-fungible tokens in gaming applications. The electronic device may track a set of gaming assets (e.g., a weapon, a gaming tool, or an avatar) associated with a player in a gaming application (e.g., an athletic gaming application, a sports gaming application, or a fighting gaming application). The electronic device may receive metadata associated with the tracked set of gaming assets. Examples of the metadata of a gaming asset may include information, such as, but not limited to, properties of the gaming asset, a color of the gaming asset, a shape of the gaming asset, or powers related to the gaming asset. The electronic device may further create, based on the received metadata, a super-fungible. Herein, the super-fungible token may be created based on a storage of the received metadata to a distributed ledger associated with the gaming application, and the creation of the super-fungible token may correspond to an ownership of a single gaming asset from the tracked set of gaming assets by the player in the gaming application at a time instant. The electronic device may receive a first user input indicative of a selection of a first gaming asset from the tracked set of gaming assets in the gaming application. The electronic device may further enable the selected first gaming asset in the gaming application, based on the received first user input and on the created super-fungible token. The electronic device may disable a set of second gaming assets of the tracked set of gaming assets in the gaming application, based on the enabled first gaming asset and on the created super-fungible token. Herein, the disabled set of second gaming assets may correspond to gaming assets other than the enabled first gaming asset of the tracked set of gaming assets.

Typically, the player may earn or buy certain points, and gifts such as, items or other gaming assets when the player plays a game. Hence, a provision for selection of only one gaming asset or item out of the set of gaming assets or items at a time may be needed. The disclosed electronic device may create the super-fungible token based on the received metadata. The disclosed electronic device may receive the first user input indicative of the selection of the first gaming asset from the tracked set of gaming assets in the gaming application. disclosed electronic device may enable the selected first gaming asset in the gaming application, based on the received first user input and on the created super-fungible token. The disclosed electronic device may disable the set of second gaming assets of the tracked set of gaming assets in the gaming application, based on the enabled first gaming asset and on the created super-fungible token. The selected enablement of a certain gaming asset may lead to a disablement of the other gaming assets of the set of gaming assets. Thus, the disclosed electronic device may ensure that only one gaming asset (i.e., the selected first gaming asset)

out of the set of gaming assets may be enabled in the gaming application for the player at any one time instant.

FIG. 1 is a block diagram that illustrates an exemplary network environment for implementation of super-fungible tokens for gaming applications, in accordance with an embodiment of the disclosure. With reference to FIG. 1, there is shown a network environment 100. The network environment 100 may include an electronic device 102, a server 104, a database 106, a distributed ledger 108, and a communication network 114. The electronic device 102 may include set of gaming applications 102A. The electronic device 102, the server 104, and the distributed ledger 108 may be communicatively coupled to one another, via the communication network 114. In FIG. 1, there is further shown a super-fungible token 110 comprising a set of non-fungible tokens (NFTs) 112. The set of NFTs 112 may include 'N' number of NFTs such as, a first NFT 112A, a second NFT 112B, . . . and an Nth NFT 112N. In FIG. 1, there is further shown a user 116, who may be associated with or who may operate the electronic device 102. The N number of NFTs shown in FIG. 1 is presented merely as an example. The set of NFTs 112 may include only two NFTs or more than N NFTs, without deviation from the scope of the disclosure. For the sake of brevity, only N NFTs have been shown in FIG. 1. However, in some embodiments, there may be more than N NFTs, without limiting the scope of the disclosure.

The electronic device 102 may include suitable logic, circuitry, interfaces, and/or code that may be configured to track a set of gaming assets associated with a player in a gaming application. The electronic device 102 may be further configured to receive metadata associated with the tracked set of gaming assets. The electronic device 102 may be further configured to create, based on the received metadata, a super-fungible token (such as, the super-fungible token 110). Examples of the electronic device 102 may include, but are not limited to, a computing device, a smartphone, a cellular phone, a mobile phone, a gaming device, a mainframe machine, a server, a computer workstation, and/or a consumer electronic (CE) device.

The server 104 may include suitable logic, circuitry, and interfaces, and/or code that may be configured to receive a first user input indicative of a selection of a first gaming asset from the tracked set of gaming assets in the gaming application. The server 104 may be further configured to enable the selected first gaming asset in the gaming application, based on the received first user input and on the created super-fungible token. The server 104 may be further configured to disable a set of second gaming assets of the tracked set of gaming assets in the gaming application, based on the enabled first gaming asset and on the created super-fungible token. The disabled set of second gaming assets may correspond to gaming assets other than the enabled first gaming asset of the tracked set of gaming assets. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the set of gaming applications 102A. The database 106 may be derived from data off a relational or non-relational database, or a set of comma-separated values (csv) files in conventional or big-data storage. The database 106 may be stored or cached on a device, such as a server (e.g., the server 104) or the electronic device 102. The device storing the database 106 may be configured to receive a query for information associated with the set of gaming applications 102A. Examples of such information includes the metadata associated with the tracked set of gaming assets. In response, the device of the database 106 may be configured to retrieve and provide the queried information to the electronic device 102 based on the received query.

In some embodiments, the database 106 may be hosted on a plurality of servers, which may be located at a same location or at different locations. The operations of the database 106 may be executed using hardware including a processor, a microprocessor (e.g., to perform or control performance of one or more operations), a field-programmable gate array (FPGA), or an application-specific integrated circuit (ASIC). In some other instances, the database 106 may be implemented using software.

The distributed ledger 108 may be a decentralized and distributed database system that may maintain an immutable record of data operations or transactions, such as, the super-fungible token 110 (including for example, the set of NFTs 112). A set of data operations may be grouped together as a block and may be further linked to a previous block of data operations to form a chain of a plurality of blocks. All blocks of data operations may be stored in a decentralized manner, whereby all participants or nodes store all the plurality of blocks. Further, the distributed ledger 108 may include an operating system which may allow for deployment of the group of smart contracts between multiple parties, for example, the user 116 and the electronic device 102.

The distributed ledger 108 may be a chain of blocks which uses accounts as state objects and a state of each account can be tracked by the chain. The accounts represent identities of users, mining nodes, or automated agents. All the blocks of data operations or the smart contract are associated with the accounts on the chain of blocks. By way of example, and not limitation, the distributed ledger 108 may be an Ethereum blockchain which may use accounts as state objects and a state of each account can be tracked by the Ethereum blockchain. The scope of the disclosure may not be limited to the implementation of the distributed ledger 108 as the Ethereum blockchain. The distributed ledger 108 may correspond to a Hyperledger blockchain, or a Corda blockchain. Other implementations of the distributed ledger 108 may be employed in the present disclosure, without a deviation from the scope of the present disclosure.

The communication network 114 may include a communication medium through which the electronic device 102, the server 104, and the distributed ledger 108 may communicate with one another. The communication network 114 may be one of a wired connection or a wireless connection.

Examples of the communication network 114 may include, but are not limited to, the Internet, a cloud network, Cellular or Wireless Mobile Network (such as Long-Term Evolution and $5^{th}$ Generation (5G) New Radio (NR)), a satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 114 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to track a set of gaming assets associated with a player in a gaming application of the set of gaming applications 102A. The gaming application may be an application that may be used to play a virtual game on the electronic device 102. The player, such as, the user 116 of FIG. 1, may use the set of gaming assets to play the gaming application. Details related to the set of gaming assets are provided, for example, in FIG. 3.

The electronic device 102 may be configured to receive metadata associated with the tracked set of gaming assets. The metadata may include details associated with the tracked set of gaming assets. For example, the metadata may include details such as, properties of each of the tracked set of gaming assets. Details related to the metadata are provided, for example, in FIG. 3.

The electronic device 102 may be configured to create a super-fungible token (e.g., the super-fungible token 110), based on the received metadata. Herein, the super-fungible token 110 may be created based on a storage of the received metadata to the distributed ledger 108 associated with the gaming application. Further, the creation of the super-fungible token 110 may correspond to an ownership of the single gaming asset from the tracked set of gaming assets by the player in the gaming application at a time instant. The super-fungible token 110 may represent the ownership of one gaming asset from the set of gaming assets. In other words, the possession of the super-fungible token 110 by the user 116 may indicate that the user 116 may possess each gaming asset of the tracked set of gaming assets associated with the super-fungible token 110. However, at any given instant, only one of the set of gaming assets corresponding to the super-fungible token 110 may be enabled for the user 116 in the gaming application that the user 116 may play.

The electronic device 102 may be further configured to receive the first user input indicative of the selection of the first gaming asset from the tracked set of gaming assets in the gaming application. Various modes for reception of the first user input may be provided. The player (e.g., the user 116) may provide the first user input in order to select the first gaming asset. Details related to the first user input are provided, for example, in FIG. 3.

The electronic device 102 may be further configured to enable the selected first gaming asset in the gaming application based on the received first user input and on the created super-fungible token. Once, the first user input is received, the first gaming asset may be enabled in the gaming application, so that the player may use the first gaming asset to play the gaming application. Details related to the enablement of the selected first gaming asset are provided, for example, in FIG. 3.

The electronic device 102 may be further configured to disable a set of second gaming assets of the tracked set of gaming assets in the gaming application, based on the enabled first gaming asset and on the created super-fungible token. The disabled set of second gaming assets may correspond to gaming assets other than the enabled first gaming asset of the tracked set of gaming assets. Each of the set of second gaming assets may be disabled in order to ensure that only the selected first gaming asset may be enabled in the gaming application. Thus, the player (i.e., the user 116) may be able to use only one gaming asset (i.e., the selected first gaming asset) at a time in the gaming application. Details related to the disablement of the set of second gaming assets are provided, for example, in FIG. 3 and FIG. 4.

Figure 2:
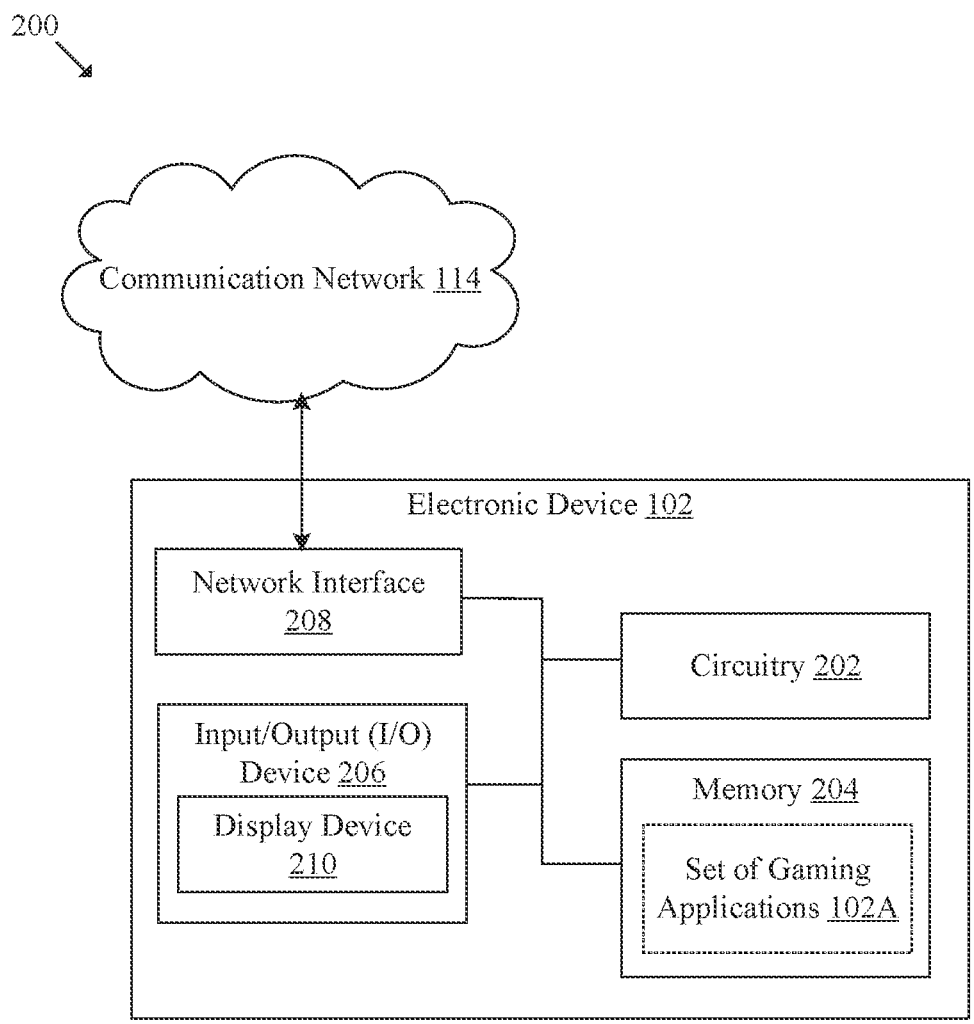
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the exemplary electronic device 102. The electronic device 102 may include circuitry 202, a memory 204, an input/output (I/O) device 206, and a network interface 208. The memory 204 may include or store the set of gaming applications 102A, and the input/output (I/O) device 206 may include a display device 210. The network interface 208 may connect the electronic device 102 with the server 104, and/or the distributed ledger 108, via the communication network 114.

The circuitry 202 may include suitable logic, circuitry, and/or interfaces that may be configured to execute program instructions associated with different operations to be executed by the electronic device 102. The operations may include gaming asset tracking, metadata reception, super-fungible token creation, first user input reception, first NFT retrieval, first gaming asset enablement, and set of second gaming assets disablement. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The one or more instructions stored in the memory 204 may be configured to execute the different operations of the circuitry 202 (and/or the electronic device 102). The memory 204 may be configured to store the set of gaming applications 102A. The memory 204 may further store the metadata associated with the tracked set of gaming assets. Examples of implementation of the memory 204 may include, but are not limited to, Random Access Memory (RAM), Read Only Memory (ROM), Electrically Erasable Programmable Read- Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive the first user input indicative of the selection of the first gaming asset from the tracked set of gaming assets in the gaming application. The I/O device 206 may be further configured to display a user interface associated with the set of gaming applications 102A, the set of gaming assets, and the selected first gaming asset. The I/O device 206 may include the display device 210. Examples of the I/O device 206 may include, but are not limited to, a touch screen, a keyboard, a mouse, a joystick, a microphone, or a speaker. Examples of the I/O device 206 may further include braille I/O devices, such as, braille keyboards and braille readers.

The network interface 208 may include suitable logic, circuitry, interfaces, and/or code that may be configured to facilitate communication between the electronic device 102 and the distributed ledger 108. The network interface 208 may be implemented by use of various known technologies to support wired or wireless communication of the electronic device 102 with the communication network. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display a user interface associated with the set of gaming applications 102A, the set of gaming assets, and the selected first gaming asset. The display device 210 may be a touch screen which may enable a user (e.g., the user 116) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for implementation of gaming assets as NFTs across save states of gaming applications are described further, for example, in FIG. 4.

Figure 3:
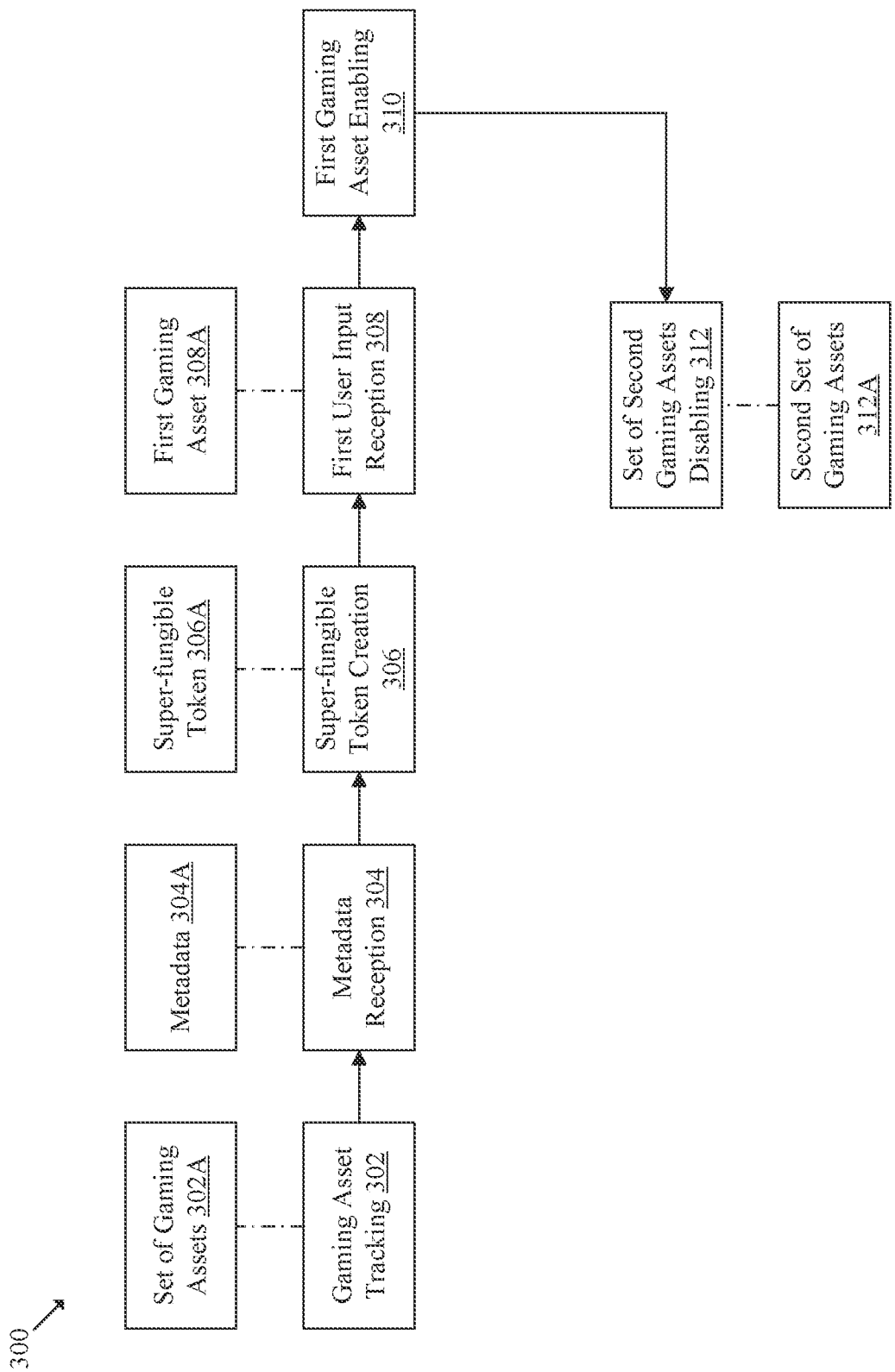
FIG. 3 is a diagram that illustrates an exemplary processing pipeline for implementation of super-fungible tokens for gaming applications, in accordance with an embodiment of the disclosure.

FIG. 3 is a diagram that illustrates an exemplary processing pipeline for implementation of super-fungible tokens for gaming applications, in accordance with an embodiment of the disclosure. FIG. 3 is explained in conjunction with elements from FIG. 1 and FIG. 2. With reference to FIG. 3, there is shown an exemplary processing pipeline 300 that illustrates exemplary operations from 302 to 312 for implementation of gaming assets as a super-fungible token including a set of NFTs. The operations 302 to 312 may be executed by any computing system, for example, by the electronic device 102 of FIG. 1 or by the circuitry 202 of FIG. 2. The exemplary processing pipeline 300 further illustrates a set of gaming asset 302A, metadata 304A, a super-fungible token 306A, a first gaming asset 308A, a set of second gaming assets 312A, and the distributed ledger 108.

At 302, an operation to track the set of gaming assets tracking may be executed. The circuitry 202 may be configured to track the set of gaming assets 302A associated with a player in a gaming application. It may be appreciated that the gaming asset may be tools that may be used to play the gaming application effectively. The gaming application may correspond to a virtual game or a video game that may be played on electronic devices such as, a computer, a tablet computer, a mobile device, a wearable device, or a gaming console. The player such as, the user 116 of FIG. 1, may use the set of gaming assets 302A to play the gaming application. In an example, the gaming application may be a football gaming application, and the gaming asset may be a football. In another example, the gaming application may be a vehicle racing gaming application, and the gaming asset may be a four-wheeler such as, a red car. In such case, a plurality of vehicles including the red car may participate in a race. The player may use one or more controls associated with the vehicle racing gaming application to move the red car in the vehicle racing gaming application. A vehicle that reaches an end point (i.e., a finish line) first may be ranked with a first position in the vehicle racing gaming application. The plurality of vehicles including the red car may be tracked throughout the race to determine insights such as, ranks, points, levels, powers earned, and the like, for the player. In another example, the gaming application may correspond to a virtual fighting gaming application, where two or more players may fight against each other and the player that defeats the other players may be regarded as the winner. In such scenario, the gaming asset may be a weapon used for the fighting. The gaming asset, i.e., the weapon, may be tracked.

In an embodiment, each of the tracked set of gaming assets may correspond to at least one of a weapon, an avatar, a costume, an accessory, a power, a vehicle, an equipment, a gaming object, a character, a prop, a building, a player status, or a gaming tool. The weapon may be used in fighting gaming applications, where the players may fight against each other using the weapons. Examples, of the weapon may include, but are not limited to, a general sword, a magic sword, an axe, a stick, a rifle, a short gun, a machine gun, and the like. The avatar may be a character that may represent the player in the gaming application. For example, the gaming application may be a running gaming application, where the player may run along a track to earn points. The avatar may be an icon that may represent the player that may run along the track. The costume may be an outfit that may be associated with the icon or avatar of the player in the gaming application. The use of costume may enrich player experience, provide certain powers associated with the costume, and the like. The accessory may be an extra item associated with the icon. For example, the accessory may be a hat that may be associated with the avatar. The vehicle may include two-wheeler vehicles or four-wheeler vehicles that may be used in the gaming application. The character may be a person in the gaming application. The prop may engage the player and may enrich gaming experience. The gaming tool may help the player to play the gaming application. The gaming asset may change according to the gaming application. For example, the gaming asset for a racing game may be the vehicle. Similarly, the gaming asset for the virtual fighting gaming application may be the weapon or the costume. In some implementations, the gaming asset may be customized by the player. For example, a player may specify aspects of the gaming asset such as size, shape, style, appearance, configurations, and attachments. In some implementations, the gaming asset may change as it is used in game play. For example, a player may upgrade the asset, use expendable units in the asset, reload expendable units in the asset, change attachments, or modify the appearance. A player status may include metadata about the player, such as a membership card for a particular guild, associated with the player in a gaming application. For example, the player status may indicate that a player achieved a goal, unlocked a power or a gaming asset, or is a member of group. The player status may also include game state information, such as an indication that the player befriended or angered a particular non-player character (or computer controlled character) in the game.

At 304, an operation to receive metadata may be executed. The circuitry 202 may be configured to receive the metadata 304A associated with the tracked set of gaming assets 302A. The metadata 304A may include details or properties associated with the tracked set of gaming assets 302A. In an example, the gaming application may be the football gaming application and the tracked set of gaming assets 302A may be a power football and a classic football. In such example, the metadata 304A may include the name of the tracked set of gaming assets 302A, which is the power football and the classic football, or may be the colors of each of the tracked set of gaming assets 302A, and the like.

At 306, an operation for creation of the super-fungible token may be executed. The circuitry 202 may be configured to create the super-fungible token 306A, based on the received metadata 304A. Herein, the super-fungible token 306A may be created based on a storage of the received metadata 304A to the distributed ledger (such as, the distributed ledger 108 of FIG. 1) associated with the gaming application. Further, the creation of the super-fungible token 306A may correspond to an ownership of a single gaming asset from the tracked set of gaming assets 302A by the player in the gaming application at a time instant. In other words, the player of the gaming application may own a single gaming asset corresponding to the created super-fungible token 306A at any time. It may be noted that the tracked set of gaming assets 302A may include one or more gaming assets. For example, the gaming application may be the fighting gaming application and tracked set of gaming assets 302A may include, but is not limited to, a classic sword, a power sword, a lightning sword, a knife, and a saw. The super-fungible token 306A may correspond to ownership of one gaming asset at a time. Thus, if the super-fungible token 306A corresponds to the classic sword at a given time, then the user 116 may use the only classic sword in the fighting gaming application, however, all other gaming assets (such as, other weapons) may be disabled for the user 116 in the fighting gaming application, at the particular time. Thereafter, if the user 116 wishes to use the lightning sword, the classic sword may be removed from the fighting gaming application and the lightning sword may be selected as the first gaming asset 308A. In such case, the super-fungible token 306A may correspond to the lightning sword.

In an embodiment, the created super-fungible token 306A may include the set of non-fungible tokens (NFTs) (such as, the set of NFTs 112 of FIG. 1), and each NFT of the set of NFTs may be associated with the corresponding gaming asset of the tracked set of gaming assets 302A. Further, as discussed, the super-fungible token 306A may be created based on the storage of the received metadata 304A to the distributed ledger 108 associated with the gaming application. The distributed ledger 108 may be shared across the gaming application. It may be appreciated that the NFT may be a non-changeable or non-fungible unit of data that may be stored on the distributed ledger 108. Examples of the data unit associated with the NFT may be photos, videos, gaming assets, and other digital assets. The NFT may be traded and an owner of the NFT or a buyer of the NFT may have rights over the NFT, similar to rights over a physical movable or immovable property. For example, if the set of gaming assets 302A includes a football and a player's jersey, the metadata 304A associated with the football may include a shape (such as, circular), a color (such as, white), and a name (such as, a football), and the metadata 304A associated with the player's jersey may include a jersey color, a team logo/name, and a jersey image. In such case, then the circuitry 202 may store the metadata 304A associated with the football and the metadata 304A associated with the player's jersey to the distributed ledger 108 to create the super-fungible token 306A associated with the set of gaming assets 302A, such as, the football and the player's jersey. The NFT may represent an ownership of a particular gaming asset, whereas the super-fungible token 306A may represent an ownership of a collection of gaming assets (i.e., the set of gaming assets 302A), out of which only one gaming asset may be enabled at a time.

At 308, an operation to receive the first user input may be executed. The circuitry 202 may be configured to receive the first user input indicative of the selection of the first gaming asset 308A from the tracked set of gaming assets 302A in the gaming application. The tracked set of gaming assets 302A may include one or more gaming assets. In case, the tracked set of gaming assets 302A includes more than one gaming asset, the first user input may be received. The first user input may correspond to the first gaming asset 308A. In an embodiment, a drop-down menu including a list of each of the tracked set of gaming assets 302A may be displayed on the display device 210. The circuitry 202 may receive the first user input from the user 116, based on a selection of the first gaming asset 308A by the user 116 from the drop-down menu. For example, the gaming application may be the football gaming application and the tracked set of gaming applications 102A may include a classic football, a power football, a knee guard, and a pair of running shoes. The first user input may indicate a user selection of the power football as the first gaming asset 308A.

At 310, an operation to enable the first gaming asset may be executed. The circuitry 202 may be configured to enable the selected first gaming asset 308A in the gaming application, based on the received first user input and on the created super-fungible token 306A. For example, based on the received first user input, the selected first gaming asset 308A may correspond to the classic sword of the fighting gaming application. Once the first user input is received, the classic sword may be enabled in the fighting gaming application for the player to use in the fighting gaming application.

In an embodiment, the circuitry 202 may be further configured to retrieve, from the distributed ledger 108, a first NFT (e.g., the first NFT 112A) of the set of NFTs (e.g., the set of NFTs 112) included in the created super-fungible token 306A. Herein, the first NFT 112A may be retrieved based on the selection of the first gaming asset 308A. In an embodiment, the selected first gaming asset 308A may be further enabled in the gaming application, based on the retrieved first NFT 112A. As discussed, each of the tracked set of gaming assets 302A may be associated with a corresponding NFT. The first gaming asset 308A may be associated with the first NFT 112A. Once, the first gaming asset 308A is selected based on the received first user input, the first NFT may be retrieved from the distributed ledger 108, so that the created super-fungible token 306A may correspond to the ownership of the first gaming asset 308A. The circuitry 202 may request the distributed ledger 108 for the retrieval of the first NFT. The distributed ledger 108 may verify whether the request sent by the circuitry 202 is legitimate and may provide the first NFT 112A based on a success of the verification. Once the first NFT 112A is retrieved, the first gaming asset 308A may be enabled in the gaming application so that the player may use the first gaming asset 308A to play the gaming application. For example, the first NFT may correspond to the classic sword of the fighting gaming application. Once the first NFT is retrieved from the distributed ledger 108, the classic sword may be enabled in the fighting gaming application for the player to use in the fighting gaming application. The enablement of the classic sword in the fighting gaming application may correspond to the ownership of the player (such as, user 116) for the classic sword (i.e., gaming asset).

At 312, an operation to disable the set of second gaming assets may be executed. The circuitry 202 may be configured to disable the set of second gaming assets 312A of the tracked set of gaming assets 302A in the gaming application, based on the enabled first gaming asset 308A and on the created super-fungible token 306A. The disabled set of second gaming assets 312A may correspond to gaming assets other than the enabled first gaming asset of the tracked set of gaming assets 302A. In an example, the gaming application may be the vehicle racing gaming application and the tracked set of gaming assets 302A may be a vehicle A, a vehicle B, a vehicle C, a vehicle D, and a vehicle E. Initially, the player may use the vehicle B to play the vehicle racing gaming application. However, at a later time, the player may wish to play the vehicle racing gaming application using the vehicle D, and consequently, the first user input, which may be indicative of a selection of the vehicle D by the player, may be received by the circuitry 202. Herein, the vehicle D may be selected as the first gaming asset 308A based on the first user input. The first NFT corresponding to the vehicle D may be retrieved and the vehicle D may be enabled in the vehicle racing gaming application. Other vehicles of the tracked set of the gaming assets 302A (such as, the vehicle A, the vehicle B, the vehicle C, and the vehicle E) may correspond to the set of second gaming assets 312A, which may be disabled in the vehicle racing gaming application. Thus, at any time instant, only one gaming asset may be enabled and used by the player in the gaming application.

In an embodiment, the circuitry 202 may be further configured to select the set of second gaming assets 312A, based on the enabled first gaming asset 308A. The circuitry 202 may be further configured to retrieve from the distributed ledger 108, a set of second NFTs of the set of NFTs, which may be included in the created super-fungible token 306A. The retrieval of the set of second NFTs may be based on the selected set of second gaming assets 312A. The selected set of second gaming assets 312A may be disabled in the gaming application further based on the retrieved first NFT and the retrieved set of second NFTs. For example, the set of second gaming assets 312A may be selected, based on the enabled first gaming asset 308A, as the set of second gaming assets 312A may correspond to all gaming assets other than the enabled first gaming asset 308A in the tracked set of gaming assets 302A. Based on the selected set of second gaming assets 312A, the circuitry 202 may be configured to retrieve from the distributed ledger 108, the set of second NFTs of the set of NFTs, which may be included in the created super-fungible token 306A. The set of second NFTs may include each of the set of NFTs except the first NFT. The circuitry 202 may request the distributed ledger 108 to retrieve the second set of NFTs. The distributed ledger 108 may verify whether the request of the circuitry 202 is legitimate and may retrieve the second set of NFTs, based on the verification.

The selected set of second gaming assets 312A may be disabled in the gaming application further based on the retrieved first NFT and the retrieved set of second NFTs. Once, the set of second NFTs is retrieved, the selected set of second gaming assets 312A may be disabled in the gaming application. Thus, each of the selected set of second gaming assets 312A may not be used in the gaming application, while the first gaming asset 308A is enabled and used in the gaming application. The first gaming asset 308A may be the only gaming asset out of the set of gaming assets 302A that may be used by the player in the gaming application at a particular time instant. In case the player wishes to use another gaming asset other than the first gaming asset 308A, operation 302 to operation 312 may be executed again, for the other gaming asset that is to be used by the player.

In an embodiment, the circuitry 202 may be further configured to receive a second user input indicative of a selection of a third gaming asset from the tracked set of gaming assets 302A in the gaming application. The third gaming asset may be different from the first gaming asset 308A. The circuitry 202 may be further configured to retrieve, from the distributed ledger 108, a third NFT of the set of NFTs, which may be included in the created super-fungible token 306A. The retrieval of the third NFT may be based on the selected third gaming asset. The third NFT may be different from a first NFT. The first NFT may be retrieved based on the selected first gaming asset 308A. The circuitry 202 may be further configured to enable the selected third gaming asset in the gaming application, based on the retrieved third NFT. The circuitry 202 may be further configured to disable the first gaming asset 308A in the gaming application, based on the enabled third gaming asset.

For example, the circuitry 202 may receive the second user input, which may be indicative of the selection of the third gaming asset from the tracked set of gaming assets 302A in the gaming application. The third gaming asset may be different from the first gaming asset 308A. In an embodiment, the tracked set of gaming assets 302A may be displayed on the display device 210 as graphical elements. In an example, the gaming application may be a running gaming application and the tracked set of gaming assets 302A may be, but is not limited to, a speed board, the pair of running shoes, a cap, and a pair of jumping shoes. The first gaming asset 308A may be selected as the pair of running shoes. Each of the tracked set of gaming assets 302A may be displayed on the display device 210 and the player may select the speed board as the third gaming asset. Herein, the speed board may be used to slide over a track in the gaming application. Initially, the first gaming asset 308A (i.e., the pair of running shoes) may be enabled and used by the player in the running gaming application. Once, the third gaming asset, i.e., the speed board, is selected based on the second user input by the player, the third gaming asset (i.e., the speed board) may be enabled and the first gaming asset 308A (i.e., the pair of running shoes) may be disabled in the running gaming application. Based on the enablement of the speed board and the disablement of the pair of running shoes in the running gaming application, the player may be able to use the speed board in the running gaming application, while the pair of running shoes may be unavailable for use by the player in the running gaming application.

In an example, based on the selected third gaming asset, the circuitry 202 may be configured to retrieve, from the distributed ledger 108, a third NFT of the set of NFTs, which may be included in the created super-fungible token 306A. Herein, the third NFT may be different from the first NFT. The circuitry 202 may transmit a request for the third NFT to the distributed ledger 108. The distributed ledger 108 may verify the request and may provide the third NFT to the circuitry 202 based on the verification. As the selected third gaming asset may be different from the first gaming asset 308A, the third NFT corresponding to the third gaming asset may also be different from the first NFT corresponding to the first gaming asset 308A.

The circuitry 202 may be further configured to enable the selected third gaming asset in the gaming application, based on the retrieved third NFT. The enablement of the third gaming asset may ensure that the third gaming asset is available for use in the gaming application and the player may subsequently use the third gaming asset in the gaming application. In an example, the gaming application may be the vehicle racing gaming application and the tracked set of gaming assets 302A may include the vehicle A, the vehicle B, the vehicle C, the vehicle D, and the vehicle E. The vehicle B may be selected as the first gaming asset 308A and the vehicle E may be selected as the third gaming asset. In such case, the third NFT for the vehicle E may be retrieved. Thereafter, the vehicle E may be enabled for use in the vehicle racing gaming application, based on the retrieved third NFT. Thus, the player may now use the vehicle E in the vehicle racing gaming application.

The circuitry 202 may be further configured to disable the first gaming asset 308A in the gaming application, based on the enabled third gaming asset. The first gaming asset 308 may be disabled in order to ensure that only one gaming asset out of the tracked set of gaming assets 302A may be used at any given time instant in the gaming application. Thus, the player may be able to use the third gaming asset but may not be able to use the first gaming asset.

In an embodiment, the first gaming asset 308A may be disabled further based on the retrieved first NFT and the retrieved third NFT. The circuitry 202 may be configured to disassociate the first gaming asset 308A corresponding to the first NFT from the gaming application in order to disable the first gaming asset 308A. Further, the circuitry 202 may be configured to associate the third gaming asset corresponding to the third NFT with the gaming application in order to enable the third gaming asset. Based on the disablement of the first gaming asset 308A and the enablement of the third gaming asset, the player may be able to use the third gaming asset in the gaming application, while the first gaming asset 308A may no longer be available for the player in the gaming application.

In an embodiment, the circuitry 202 may be further configured to determine a new gaming asset acquired by the player in the gaming application, based on the tracked set of gaming assets. The circuitry 202 may be further configured to update the tracked set of gaming assets, based on the determined new gaming asset. The circuitry 202 may be further configured to receive updated metadata associated with the updated set of gaming assets. The circuitry 202 may be further configured to create a new NFT associated with the new gaming asset, based on the updated metadata. The circuitry 202 may be further configured to update the super-fungible token to further include the created new NFT.

For example, based on the tracked set of gaming assets 302A, the circuitry 202 may determine that a new gaming asset is acquired by the player in the gaming application. It may be appreciated that the player may earn or buy one or more new gaming assets when the player plays the gaming application. In an example, the gaming application may be the running gaming application. The tracked set of gaming assets 302A may be, but is not limited to, a pair of jumping shoes, a cap, and a speed board. The player may earn or buy a slide board when the player plays the running gaming application. In such case, the slide board may be the new gaming asset that may be acquired by the player.

The circuitry 202 may be further configured to update the tracked set of gaming assets 302A, based on the determined new gaming asset. As the tracked set of gaming assets 302A may not include the determined new gaming asset, the determined new gaming asset may be added to the tracked set of gaming assets 302A in order to obtain the updated set of gaming assets. In an example, the tracked set of gaming assets 302A may be an axe, a knife, a classic sword, and a lightning sword. The new gaming asset may be a shield that may be added to the tracked set of gaming assets 302A. The updated set of gaming asset 302A may thereby include the axe, the knife, the classic sword, the lightning sword, and shield (i.e., the newly added gaming asset).

In an embodiment, the updated set of gaming assets may further include the determined new gaming asset. As discussed in the aforementioned, the determined new gaming asset may be added to the tracked set of gaming assets in order to obtain the updated set of gaming assets. In other words, the new gaming asset may now become a part of the updated set of gaming assets.

The circuitry 202 may be further configured to receive updated metadata associated with the updated set of gaming assets. In an example, the updated metadata may include properties such as, a name, shape, color, purpose, and powers, of each of the updated set of gaming assets. For example, if the determined new gaming asset is a cap, the metadata of the updated set of gaming assets may be updated based on inclusion of properties of the cap, such as, name of the cap, a color of the cap, a purpose or powers of the cap (for example, to prevent a head injury or as a fashion/style element).

The circuitry 202 may be further configured to create the new NFT associated with the new gaming asset, based on the received updated metadata. The new NFT may be created based on a storage of the received metadata to the distributed ledger 108 associated with the gaming application. In an example, the new gaming asset may be the power sword. The metadata associated with the power sword may be the name (e.g., "power sword"), the purpose (e.g., a lethal weapon), the color (e.g., steel grey), and the powers (e.g., an extent of force that may be applied by use of the power sword). The metadata including, for example, the name, the purpose, the color, and the powers, of the power sword, may be stored in the distributed ledger 108 to create the new NFT associated with the power sword.

The circuitry 202 may be further configured to update the super-fungible token to further include the created new NFT. As the super-fungible token may include the set of NFTs, the set of NFTs may be updated to include the created new NFT. Further, the super-fungible token 306A may be updated based on the storage of the received updated metadata (including the metadata associated with the created new NFT) to the distributed ledger 108 associated with the gaming application.

In an embodiment, the circuitry 202 may be further configured to receive a third user input indicative of a selection of the new gaming asset from the updated set of gaming assets in the gaming application. The circuitry 202 may be further configured to retrieve, from the distributed ledger 108, the created new NFT, which may be included in the updated super-fungible token. The retrieval of the new NFT may be based on the selected new gaming asset. The circuitry 202 may be further configured to enable the selected new gaming asset in the gaming application, based on the retrieved new NFT. The circuitry 202 may be further configured to disable the first gaming asset in the gaming application, based on the enabled new gaming asset.

For example, the circuitry 202 may receive the third user input that may be indicative of the selection of the new gaming asset from the updated set of gaming assets in the gaming application. In an example, the tracked set of gaming assets in the racing gaming application may include, but is not limited to, a pair of racing shoes, a cap, a car, and a costume. The player may acquire a new gaming asset, such as, a skateboard, in the racing gaming application. The updated set of gaming assets may include the tracked set of gaming assets and may further include the new gaming asset, i.e., the skateboard. The circuitry 202 may display each of the updated set of gaming assets on the display device 210 and the player may select the new gaming asset, i.e., the skateboard, for use in the racing gaming application. Initially, the first gaming asset 308A, for example, the pair of running shoes, may be enabled and used by the player in the running gaming application. Once, the new gaming asset (i.e., the skateboard) is selected based on the third user input by the player, the new gaming asset (i.e., the skateboard) may be enabled and the first gaming asset 308A (i.e., the pair of running shoes) may be disabled in the running gaming application. Based on the enablement of the skateboard and the disablement of the pair of running shoes in the running gaming application, the player may be able to use the skateboard in the running gaming application, while the pair of running shoes may be unavailable for use by the player in the running gaming application.

The circuitry 202 may be further configured to retrieve from the distributed ledger 108, the created new NFT included in the updated super-fungible token, based on the selected new gaming asset. The circuitry 202 may transmit a request to the distributed ledger 108 to retrieve the created new NFT corresponding to the selected new gaming asset. The distributed ledger 108 may verify whether the request of the circuitry 202 is legitimate and may retrieve the created new NFT, based on the verification. The circuitry 202 may be further configured to enable the selected new gaming asset in the gaming application, based on the retrieved new NFT. The selected new gaming asset may be enabled in the gaming application so that the player may use the selected gaming asset to play the gaming application.

The circuitry 202 may be further configured to disable the first gaming asset 308A in the gaming application, based on the enabled new gaming asset. The circuitry 202 may disable the first gaming asset 308A so that the player may not be able to use two gaming assets of the updated set of gaming assets at a time instant. The gaming assets other than the first gaming asset 308A and the new gaming asset (i.e., the set of second gaming assets) in the updated set of gaming assets, may not need to be disabled as such gaming assets may be already disabled when the first gaming asset 308A is enabled. Thus, based on the disabled first gaming asset 308A, the player may be able to use only the selected new gaming asset to play the gaming application. In an example, the gaming application may be the running gaming application and the updated set of gaming assets may be the speed board, the pair of running shoes, the cap, and the slide board. In case the selected new gaming asset is the slide board and the first gaming asset 308A is the speed board, the speed board may be disabled, and the slide board may be enabled. The remaining gaming assets (i.e., the pair of running shoes, and the cap) may also be disabled. Thus, at a time instant the player may be able to use only one gaming asset, out of the updated set of gaming assets.

In an embodiment, the circuitry 202 may be further configured to determine whether the first gaming asset 308A is consumed by the player in the gaming application, based on the tracked set of gaming assets 302A. The circuitry 202 may be further configured to update the tracked set of gaming assets 302A, based on the determination that the first gaming asset 308A is consumed. The super-fungible token may be updated to exclude, from the set of NFTs 112 included in the super-fungible token 306A, the first NFT 112A associated with the consumed first gaming asset 308A.

For example, the circuitry 202 may determine whether the first gaming asset 308A is consumed by the player in the gaming application, based on the tracked set of gaming assets 302A. It may be noted that a gaming asset of the gaming application may be used up or destroyed in the gaming application with time or due to other factors, such as, when the player is defeated in at a certain stage, and the like. In an example, the first gaming asset 308A may be used only once. The player may need to acquire the first gaming asset 308A again for use. For example, a sword may be used only once in the fighting gaming application and may not be used again. The player may need to acquire the sword again in the fighting gaming application to reuse the sword.

In case the first gaming asset 308A is determined as consumed or destroyed in the gaming application, the circuitry 202 may accordingly update the tracked set of gaming assets 302A. For example, based on the consumption or destruction of the first gaming asset 308A in the gaming application, the circuitry 202 may exclude the first gaming asset 308A from the tracked set of gaming assets 302A. In such case, the updated set of gaming assets may correspond to the set of second gaming assets (i.e., the gaming assets other than the first gaming assets in the gaming application). Further, based on the determination that the first gaming asset 308A is consumed or destroyed, the super-fungible token 306A may be updated to exclude the retrieved first NFT corresponding to the first gaming asset 308A. Thus, once, the first gaming asset 308A is consumed or destroyed, the tracked set of gaming assets 302A may be updated to exclude the first gaming asset 308A, so that the player may not reuse it further. Also, the super-fungible token 306A may be updated based on a deletion of the metadata corresponding to the first gaming asset 308A from the distributed ledger 108 associated with the gaming application. Thus, the player may be prevented from using the first gaming asset 308A. In an example, the gaming application may be the vehicle racing gaming application and the tracked set of gaming applications 102A may be the vehicle A, the vehicle B, the vehicle C, the vehicle D, and the vehicle E. The vehicle A may be selected as the first gaming asset 308A. The player may use the vehicle A and crash the vehicle A or lose a race with the vehicle A in the vehicle racing gaming application. Thus, based on the usage of the vehicle A, the vehicle A may be used up or may be destroyed, and may not be used again. Thus, the tracked set of gaming assets 302A may be updated such that the updated set of gaming assets 302A includes the vehicle B, the vehicle C, the vehicle D, and the vehicle E. The updated set of gaming assets may exclude the vehicle A. The super-fungible token may be further updated based on the updated set of gaming assets to exclude the first NFT corresponding to the vehicle A.

In an embodiment, the updated set of gaming assets may correspond to the set of second gaming assets. As discussed, the updated set of gaming assets may be obtained based on an exclusion of the first gaming asset 308A from the tracked set of gaming assets 302A. As the set of second gaming assets may include the tracked set of gaming assets 302A excluding the first gaming asset 308A, and hence, the updated set of gaming assets may correspond to the set of second gaming assets.

In an embodiment, the circuitry 202 may be further configured to receive a fourth user input indicative of a selection of a fourth gaming asset from the updated set of gaming assets in the gaming application. The circuitry 202 may be further configured to retrieve, from the distributed ledger 108, a fourth NFT, which may be included in the updated super-fungible token 306A. The retrieval of the fourth NFT may be based on the selected fourth gaming asset. The circuitry 202 may be further configured to enable the selected fourth gaming asset in the gaming application, based on the retrieved fourth NFT. The circuitry 202 may be further configured to disable the first gaming asset in the gaming application, based on the enabled fourth gaming asset.

For example, the circuitry 202 may receive the fourth user input indicative of the selection of the fourth gaming asset from the updated set of gaming assets in the gaming application. The updated set of gaming assets may include each of the tracked set of gaming assets 302A excluding the first gaming asset 308A that may be consumed or destroyed while the player plays the gaming application. In an example, the circuitry 202 may display the updated set of gaming assets on the display device 210 and may receive the fourth user input indicative of the selection of the fourth gaming asset to be enabled in the gaming application, instead of the first gaming asset 308A which may be already consumed in the gaming application.

The circuitry 202 may be further configured to retrieve from the distributed ledger 108, the fourth NFT, which may be included in the updated super-fungible token 306A. The retrieval of the fourth NFT may be based on the selected fourth gaming asset. Once, the fourth gaming asset may be selected, the circuitry 202 may transmit a request the distributed ledger 108 to retrieve the fourth NFT corresponding to the fourth gaming asset. The distributed ledger 108 may verify whether the request of the circuitry 202 is legitimate and may retrieve the selected fourth NFT and provide the retrieved fourth NFT to the circuitry 202 based on the verification. The circuitry 202 may be further configured to enable the selected fourth gaming asset in the gaming application, based on the retrieved fourth NFT. The selected fourth gaming asset may be enabled in the gaming application so that the player may use the selected fourth gaming asset instead of the first gaming asset 308A to play the gaming application.

The circuitry 202 may be further configured to disable the first gaming asset 308A in the gaming application, based on the enabled fourth gaming asset. The first gaming asset 308A may be disabled in the gaming application so that the player may not use more than one gaming asset at a time in the gaming application. It may be noted that the gaming assets other than the first gaming asset and the fourth gaming asset need not be disabled as the remaining gaming assets may already be disabled at the time of selection of the fourth gaming asset.

In an embodiment, the circuitry 202 may be further configured to receive a fifth user input indicative of an exchange of the first gaming asset 308A with a fifth gaming asset in the gaming application. The fifth gaming asset may be excluded from the tracked set of gaming assets 302A. The circuitry 202 may be further configured to update the tracked set of gaming assets 302A, based on the received fifth user input. Based on the update of the tracked set of gaming assets 302A, post the exchange of the first gaming asset 308A with the fifth gaming asset, the updated set of gaming assets may include the fifth gaming asset and may exclude the first gaming asset 308A. The circuitry 202 may be further configured to create a fifth NFT associated with the fifth gaming asset, based on the updated set of gaming assets. The circuitry 202 may be further configured to update the super-fungible token 306A to further include the created fifth NFT and exclude the first NFT 112A associated with the selected first gaming asset 308A.

For example, the circuitry 202 may receive the fifth user input indicative of the exchange of the first gaming asset 308A with the fifth gaming asset in the gaming application. The fifth gaming asset may be excluded from the tracked set of gaming assets 302A. It may be noted that in some cases, the player may earn or buy a new gaming asset such as, the fifth gaming asset that may be availed on an exchange or barter with another gaming asset, such as, the first gaming asset 308A. In an example, the gaming application may be the running gaming application and the tracked set of gaming assets 302A may include, but is not limited to, the speed board, the pair of running shoes, the cap, and the pair of jumping shoes. The player may wish to use the sliding board, which may not be present in the tracked set of gaming assets 302A. To earn or buy the sliding board, the player may exchange or trade an existing or owned gaming asset, such as, the speed board (i.e., the first gaming asset 308A) with the sliding board (i.e., the fifth gaming asset).

The circuitry 202 may be further configured to update the tracked set of gaming assets 302A, based on the received fifth user input. The updated set of gaming assets may include the fifth gaming asset (e.g., the sliding board) and may exclude the first gaming asset 308A (e.g., the speed board). Thus, the tracked set of gaming assets 302A may be updated based on a removal of the first gaming asset 308A from the tracked set of gaming assets 302A and further based on an addition of the fifth gaming asset to the tracked set of gaming asset 302A.

The circuitry 202 may be further configured to create the fifth NFT associated with the fifth gaming asset, based on the updated set of gaming assets. The circuitry 202 may receive metadata associated with the fifth gaming asset. Further, the circuitry 202 may create the fifth NFT associated with the fifth gaming asset based on the received metadata. The received metadata may include properties of the fifth gaming asset. Examples of such properties may include, but are not limited to, a name of the fifth gaming asset, a color of the fifth gaming asset, a purpose of the fifth gaming asset in the gaming application, and powers that may be acquired by a game character on use of the fifth gaming asset. The fifth NFT may be created based on the storage of the received metadata associated with the fifth gaming asset to the distributed ledger 108 associated with the gaming application.

The circuitry 202 may be further configured to update the super-fungible token 306A to further include the created fifth NFT and exclude the retrieved first NFT. In such case, the super-fungible token 306A may be updated based on the storage of the received metadata associated with the updated set of gaming assets (that may include the fifth gaming asset and exclude the first gaming asset) to the distributed ledger 108 associated with the gaming application. In an example, the gaming application may be the running gaming application and the tracked set of gaming assets 302A may be the speed board, the pair of running shoes, the cap, and the pair of jumping shoes. The speed board may be exchanged with the slide board. Thus, the updated set of gaming assets may include the slide board, the pair of running shoes, the cap, and the pair of jumping shoes. The circuitry 202 may receive the metadata associated with the updated set of gaming assets. Further, the circuitry 202 may update the super-fungible token 306A, based on the received metadata associated with the updated set of gaming assets and the created fifth NFT. In another embodiment the super-fungible token 306A may be updated based on an exchange of the first NFT with the created fifth NFT. Thus, the player may be able to use the updated super-fungible token to gain an ownership of the fifth gaming asset. However, as the fifth gaming asset may be obtained based on an exchange of the first gaming asset 308A for the fifth gaming asset, the first gaming asset 308A may no longer be available for use for the player in the gaming application.

In an embodiment, the circuitry 202 may be further configured to enable the fifth gaming asset in the gaming application, based on the created fifth NFT. The circuitry 202 may be further configured to disable the first gaming asset in the gaming application, based on the enabled fifth gaming asset. For example, based on the creation of the fifth NFT, the circuitry 202 may enable the fifth gaming asset in the gaming application. The super-fungible token 306A may be updated to further include the created fifth NFT. As the first gaming asset 308A is to be exchanged or traded for the fifth gaming asset and all the remaining assets in the tracked set of gaming assets 302A may be disabled, the fifth gaming asset may be enabled, based on the creation of the fifth NFT and the inclusion of the fifth NFT in the updated super fungible token. In addition, as the first gaming asset 308A may be exchanged for the fifth gaming asset, the corresponding first NFT associated with the first gaming asset 308A may be deleted from the super-fungible token 306A, based on the update of the super-fungible token 306A. The deletion of the first NFT may disable the corresponding first gaming asset 308A from the gaming application. Thus, the first gaming asset 308A may be replaced or exchanged by the fifth gaming asset in the gaming application. The player may no longer be able to use the first gaming asset 308A in the gaming application, though the fifth gaming asset may be available for use in the gaming application.

In an example, the gaming application may be the running gaming application and the tracked set of gaming assets 302A may include the speed board, the pair of running shoes, the cap, and the pair of jumping shoes. The speed board may be exchanged with the slide board. Thus, the updated set of gaming assets may include the slide board, the pair of running shoes, the cap, and the pair of jumping shoes. The slide board may be enabled, and the speed board may be disabled in the running gaming application in order to ensure that the player may use the slide board and not the speed board. The pair of running shoes, the cap and the pair of jumping shoes may be already disabled at the time of the exchange of the first gaming asset 308A and thus, such assets need not be disabled again.

Typically, a player of a gaming application may earn or buy certain points and virtual articles such as, items or other gaming assets when the player plays the gaming application. In some cases, the player may possess a set of items in the gaming application, however, only one item out of the set of items may be used at one time in the gaming application by the player. Hence, a provision for selection of only one gaming asset or item out of the set of gaming assets or items at a time in gaming applications may be needed. The disclosed electronic device 102 may create the super-fungible token 306A, based on the storage of the received metadata to the distributed ledger 108 associated with the gaming application. The disclosed electronic device 102 may receive the first user input indicative of the selection of the first gaming asset 308A from the tracked set of gaming assets 302A in the gaming application. The disclosed electronic device 102 may retrieve, from the distributed ledger 108, the first NFT of the set of NFTs, which may be included in the created super-fungible token 306A. The disclosed electronic device 102 may enable the selected first gaming asset 308A in the gaming application, based on the retrieved first NFT. The disclosed electronic device 102 may disable the set of second gaming assets of the tracked set of gaming assets 302A in the gaming application, based on the enabled first gaming asset 308A. The set of second gaming assets may include gaming assets of the set of gaming assets other than the first gaming asset 308A. Thus, the disclosed electronic device 102 may ensure that only one gaming asset (i.e., the selected first gaming asset 308A) out of the tracked set of gaming assets 302A may be enabled in the gaming application for the player at any one time instant.

Figure 4:
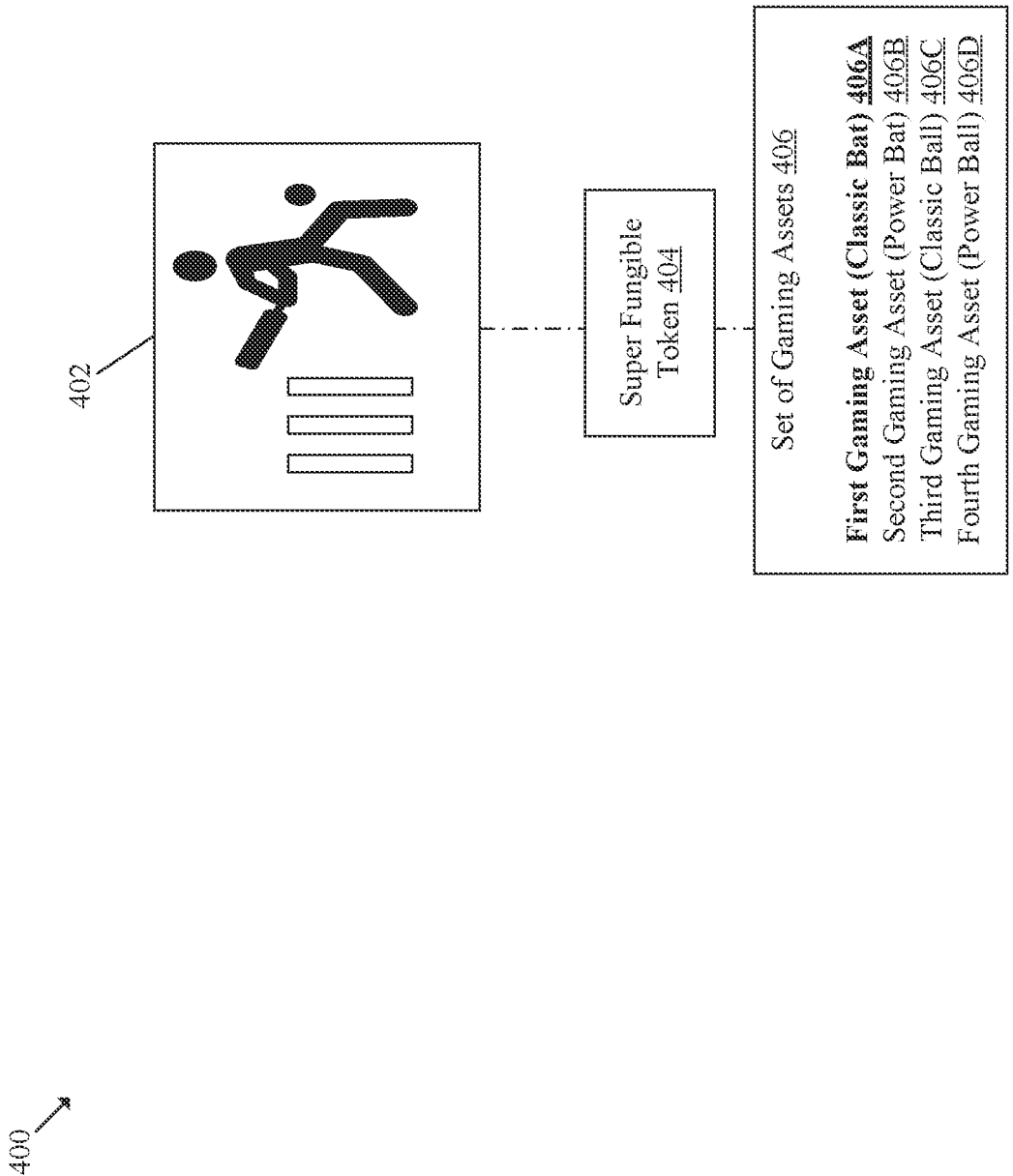
FIG. 4 is a diagram that illustrates an exemplary scenario for implementation of super-fungible tokens for gaming applications, in accordance with an embodiment of the disclosure.

FIG. 4 is a diagram that illustrates an exemplary scenario for implementation of super-fungible tokens for gaming applications, in accordance with an embodiment of the disclosure. FIG. 4 is described in conjunction with elements from FIG. 1, FIG. 2, and FIG. 3. With reference to FIG. 4, there is shown an exemplary scenario 400. The scenario 400 may include a gaming application 402 that may be played through a user-interface displayed on the display device 210 associated of the electronic device 102. The scenario 400 may further include a super-fungible token 404 associated with a set of gaming assets 406 in the gaming application 402. The set of gaming assets 406 may be owned by a player (e.g., the user 116) in the gaming application 402. The set of gaming assets 406 may include a first gaming asset 406A, a second gaming asset 406B, a third gaming asset 406C, and a fourth gaming asset 406D. For example, in case the gaming application 402 is a cricket gaming application, the first gaming asset 406A may be a classic bat, the second gaming asset 406B may be a power bat, the third gaming asset 406C may be a classic ball, and the fourth gaming asset 406D may be a power ball. A set of operations associated the scenario 400 are described herein.

The circuitry 202 of the electronic device 102 may be configured to track the set of gaming assets 406 associated with the player in the gaming application 402. The tracked set of gaming assets 406 may include the first gaming asset 406A, the second gaming asset 406B, the third gaming asset 406C, and the fourth gaming asset 406D. The circuitry 202 may be configured to create the super-fungible token 404. The super-fungible token 404 may include the set of NFTs. For example, the set of NFTs may include a first NFT associated with the first gaming asset 406A, a second NFT associated with the second gaming asset 406B, a third NFT associated with the third gaming asset 406C, and a fourth NFT associated with the fourth gaming asset 406D. The creation of the super-fungible token 404 may correspond to an ownership of a single gaming asset from the tracked set of gaming assets 406 by the player in the gaming application 402 at a time instant.

The circuitry 202 may be further configured to receive the first user input indicative of the selection of a certain gaming asset (e.g., the first gaming asset 406A) from the tracked set of gaming assets 406 for use in the gaming application 402. For example, the selected gaming asset may correspond to the first gaming asset 406A, which may be the classic bat. The circuitry 202 may retrieve, from the distributed ledger (such as, the distributed ledger 108), the first NFT (associated with the first gaming asset 406A) of the set of NFTs, which may be included in the created super-fungible token 404. Further, the circuitry 202 may enable the selected first gaming asset 406A in the gaming application 402, based on the retrieved first NFT. Also, the circuitry 202 may disable the other gaming assets of the tracked set of gaming assets 406, based on the enabled first gaming asset 406A. For example, the circuitry 202 may disable the second gaming asset 406B (i.e., the power bat), the third gaming asset 406C (i.e., the classic bowl), and the fourth gaming asset 406D (i.e., the power ball). Thus, the super-fungible token 404 may allow ownership of the tracked set of gaming assets 406. However, at any particular time, only one gaming asset (i.e., the selected gaming asset, such as, the first gaming asset 308A) may be enabled and be available for use for the player in the gaming application 402. Thus, in current example, the player may be able to use the classic bat, but not the power bat, the classic ball, or the power ball. It should be noted that the scenario 400 of FIG. 4 is for exemplary purposes and should not be construed to limit the scope of the disclosure.

Figure 5:
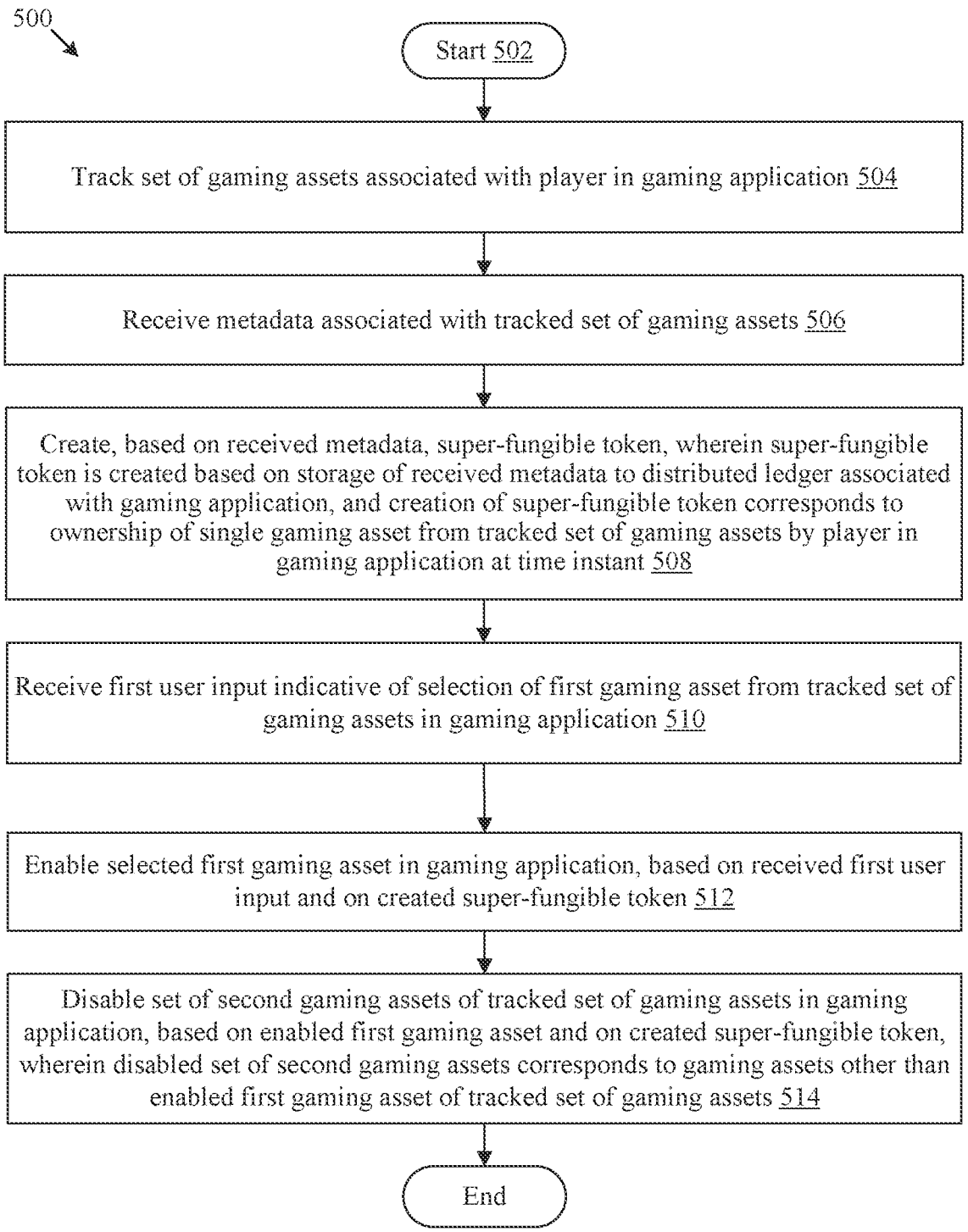
FIG. 5 is a flowchart that illustrates operations of an exemplary method for implementation of super-fungible tokens for gaming applications, in accordance with an embodiment of the disclosure.

FIG. 5 is a flowchart that illustrates operations of an exemplary method for implementation of super-fungible tokens for gaming application, in accordance with an embodiment of the disclosure. FIG. 5 is described in conjunction with elements from FIG. 1, FIG. 2, FIG. 3, and FIG. 4. With reference to FIG. 5, there is shown a flowchart 500. The flowchart 500 may include operations from 502 to 514 and may be implemented by the electronic device 102 of FIG. 1 or by the circuitry 202 of FIG. 2. The flowchart 500 may start at 502 and proceed to 504.

At 504, the set of gaming assets associated with the player in the gaming application may be tracked. The circuitry 202 may be configured to track the set of gaming assets associated with the player in the gaming application. The gaming application may correspond to an application (of the set of gaming applications 102A) that may be used to play virtual games or video games on electronic devices such as, a computer, a mobile device, a gaming console, or a wearable device. The player, such as, the user 116 of FIG. 1, may use the set of gaming assets 302A to play the gaming application. Details related to the set of gaming assets are provided, for example, in FIG. 3 (at 302).

In an embodiment, each of the tracked set of gaming assets may correspond to at least one of the weapon, the avatar, the costume, the accessory, the power, the vehicle, the equipment, the gaming object, the character, the prop, the building, the player status, or the gaming tool. The weapon may be used in fighting gaming applications, where the players may fight against each other using weapons. The avatar may be the character that may represent the player in the gaming application. The costume may be the outfit that may be associated with the icon or character of the gaming application. The accessory may be the extra item associated with the icon. The vehicle may include two-wheeler vehicles or four-wheeler vehicles that may be used in the gaming application. The character may be the person in the gaming application. The prop may engage the player and may enrich gaming experience. The gaming tool may help the player in playing the gaming application. The gaming asset may change according to the gaming application. For example, the gaming asset for a racing game may be the vehicle. Similarly, the gaming asset for the virtual fighting gaming application may be the weapon or the costume. In some implementations, the gaming asset may be customized by the player. For example, a player may specify aspects of the gaming asset such as size, shape, style, appearance, configurations, and attachments. In some implementations, the gaming asset may change as it is used in game play. For example, a player may upgrade the asset, use expendable units in the asset, reload expendable units in the asset, change attachments, or modify the appearance. A player status may include metadata about the player, such as a membership card for a particular guild, associated with the player in a gaming application. For example, the player status may indicate that a player achieved a goal, unlocked a power or a gaming asset, or is a member of group. The player status may also include game state information, such as an indication that the player befriended or angered a particular non-player character (or computer controlled character) in the game. The set of gaming assets 302A may be tracked.

At 506, metadata associated with the tracked set of gaming assets may be received. The circuitry 202 may be configured to receive the metadata associated with the tracked set of gaming assets. The metadata may provide details associated with the tracked set of gaming assets. In an example, metadata 304A may include properties of the tracked set of gaming assets, such as, the name, the color, the purpose, and powers of each of the tracked set of gaming assets. Details related to the metadata are provided, for example, in FIG. 3 (at 304).

At 508, the super-fungible token 110 including the set of non-fungible tokens (NFTs) 112 may be created based on the received metadata. The super-fungible token 110 may be created based on the storage of the received metadata to the distributed ledger 108 associated with the gaming application, and the creation of the super-fungible token 110 may correspond to the ownership of the single gaming asset from the tracked set of gaming assets by the player in the gaming application at a time instant. The circuitry 202 may be configured to create the super-fungible token 110 based on the received metadata, wherein the super-fungible token 110 may be created, based on the storage of the received metadata to the distributed ledger 108 associated with the gaming application. Further, the creation of the super-fungible token 110 may correspond to an ownership of a collection of gaming assets out of which only one gaming asset may be enabled at any point of time. Details related to the super-fungible token are provided, for example, in FIG. 3 (at 306).

At 510, the first user input indicative of the selection of the first gaming asset from the tracked set of gaming assets in the gaming application may be received. The circuitry 202 may be configured to receive the first user input indicative of the selection of the first gaming asset from the tracked set of gaming assets in the gaming application. In an embodiment, the electronic device 102 may display a user interface on the display device 210 to display the tracked set of gaming assets to the user 116. The first user input of the selection of the first gaming asset of the tracked set of gaming assets may be received through the user interface displayed on the display device 210. Details related to the selection of the first gaming asset are provided, for example, in FIG. 3 (at 308).

At 512, the selected first gaming asset in the gaming application may be enabled based on the received first user input and on the created super-fungible token 110. The circuitry 202 may be configured to enable the selected first gaming asset in the gaming application based on the received first user input and on the created super-fungible token 110. Once, the received first user input may be received, the first gaming asset may be enabled in the gaming application so that the player may use the first gaming asset in the gaming application. Details related to the enablement of the selected first gaming asset are provided, for example, in FIG. 3 (at 310).

At 514, the set of second gaming assets of the tracked set of gaming assets in the gaming application may be disabled based on the enabled first gaming asset. The disabled set of second gaming assets may correspond to gaming assets other than the enabled first gaming asset of the tracked set of gaming assets. The circuitry 202 may be configured to disable the set of second gaming assets of the tracked set of gaming assets in the gaming application, based on the enabled first gaming asset. In an example, the gaming application may be the fighting gaming application and the tracked set of gaming applications 102A may be the sword, the knife, the shield, and the axe. Initially the player may use the knife to play the fighting gaming application, however, after some time, the player may wish to use the sword. Herein, the sword may be selected as the first gaming asset based on the first user input. Other gaming assets of the tracked set of the gaming assets such as, the knife, the shield, and the axe may correspond to the set of second gaming assets, which may be disabled in the fighting gaming application. Thus, at one time only one gaming asset may be used by the player in the gaming application. Details related to the disabling the set of second gaming assets are provided, for example, in FIG. 3 (at 312) and FIG. 4. Control may pass to end.

Although the flowchart 500 is illustrated as discrete operations, such as, 504, 506, 508, 510, 512, and 514 the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include tracking a set of gaming assets (such as, the set of gaming assets 302A of FIG. 3) associated with a player (such as, the user 116 of FIG. 1) in a gaming application. The operations may further include reception of metadata (such as, the metadata 304A) associated with the tracked set of gaming assets. The operations may further include creation, based on the received metadata, of a super-fungible token (such as, the super-fungible token 306A). The super-fungible token 306A may be created based on a storage of the received metadata to a distributed ledger (such as, the distributed ledger 108) associated with the gaming application, and the creation of the super-fungible token 306A may correspond to an ownership of a single gaming asset from the tracked set of gaming assets by the player in the gaming application at a time instant. The operations may further include reception of a first user input indicative of a selection of a first gaming asset (such as, the first gaming asset 308A of FIG. 3) from the tracked set of gaming assets 302A in the gaming application. The operations may further include enablement of the selected first gaming asset in the gaming application, based on the received first user input and on the created super-fungible token 306A. The operations may further include disablement of a set of second gaming assets (such as, the set of second gaming assets 312A of FIG. 3) of the tracked set of gaming assets in the gaming application, based on the enabled first gaming asset and on the created super-fungible token 306A. Herein, the disabled set of second gaming assets may correspond to gaming assets other than the enabled first gaming asset of the tracked set of gaming assets.

Exemplary aspects of the disclosure may provide an electronic device (such as, the electronic device 102 of FIG. 1) that includes circuitry (such as, the circuitry 202). The circuitry 202 may be configured to track a set of gaming assets (such as, the set of gaming assets 302A of FIG. 3) associated with a player in a gaming application. The circuitry 202 may be configured to receive metadata associated with the tracked set of gaming assets. The circuitry 202 may be configured to create, based on the received metadata, a super-fungible token (such as, the super-fungible token 110 of FIG. 1). The super-fungible token 110 may be created based on a storage of the received metadata to a distributed ledger (such as, the distributed ledger 108) associated with the gaming application, and the creation of the super-fungible token may correspond to an ownership of a single gaming asset from the tracked set of gaming assets 302A by the player in the gaming application at a time instant. The circuitry 202 may be configured to receive a first user input indicative of a selection of a first gaming asset (such as, the first gaming asset 308A of FIG. 3) from the tracked set of gaming assets in the gaming application. The circuitry 202 may be configured to enable the selected first gaming asset in the gaming application, based on the received first user input and on the created super-fungible token 110. The circuitry 202 may be configured to disable a set of second gaming assets (such as, the set of second gaming assets 312A of FIG. 3) of the tracked set of gaming assets in the gaming application, based on the enabled first gaming asset and on the created super-fungible token 110. Herein, the disabled set of second gaming assets may correspond to gaming assets other than the enabled first gaming asset of the tracked set of gaming assets.

In an embodiment, each of the tracked set of gaming assets may correspond to at least one of a weapon, an avatar, a costume, an accessory, a power, a vehicle, an equipment, a gaming object, a character, a prop, a building, a player status, or a gaming tool.

In an embodiment, the created super-fungible token 110 may include a set of non-fungible tokens (NFTs), such as, the set of NFTs 112, and each NFT of the set of NFTs 112 may be associated with a corresponding gaming asset of the tracked set of gaming assets 302A.

In an embodiment, the circuitry 202 may be further configured to retrieve, from the distributed ledger 108, a first NFT (e.g., the first NFT 112A) of the set of NFTs 112 included in the created super-fungible token 110. Herein, the first NFT 112A may be retrieved based on the selected first gaming asset and the selected first gaming asset may be further enabled in the gaming application, based on the retrieved first NFT 112A.

In an embodiment, the circuitry 202 may be further configured to select the set of second gaming assets, based on the enabled first gaming asset. The circuitry 202 may further retrieve from the distributed ledger 108, a set of second NFTs of the set of NFTs included in the created super-fungible token, based on the selected set of second gaming assets. Herein, the selected set of second gaming assets may be disabled in the gaming application further based on the retrieved first NFT and the retrieved set of second NFTs.

In an embodiment, the circuitry 202 may be further configured to receive a second user input indicative of a selection of a third gaming asset from the tracked set of gaming assets in the gaming application. Herein, the third gaming asset may be different from the first gaming asset. The circuitry 202 may further retrieve, from the distributed ledger 108, a third NFT of the set of NFTs included in the created super-fungible token 306A, based on the selected third gaming asset. Herein, the third NFT may be different from the first NFT 112A. The circuitry 202 may further enable the selected third gaming asset in the gaming application, based on the retrieved third NFT. The circuitry 202 may further disable the first gaming asset in the gaming application, based on the enabled third gaming asset. In an embodiment, the first gaming asset may be further disabled based on the retrieved first NFT and the retrieved third NFT.

In an embodiment, the circuitry 202 may be further configured to determine a new gaming asset acquired by the player in the gaming application, based on the tracked set of gaming assets. The circuitry 202 may further update the tracked set of gaming assets, based on the determined new gaming asset. The circuitry 202 may further receive the updated metadata associated with the updated set of gaming assets. The circuitry 202 may further create a new NFT associated with the new gaming asset, based on the received updated metadata. The circuitry 202 may further update the super-fungible token 306A to further include the created new NFT. In an embodiment, the updated set of gaming assets may further include the determined new gaming asset.

In an embodiment, the circuitry 202 may be further configured to receive a third user input indicative of a selection of the new gaming asset from the updated set of gaming assets in the gaming application. The circuitry 202 may further retrieve from the distributed ledger 108, the created new NFT included in the updated super-fungible token 306A, based on the selected new gaming asset. The circuitry 202 may further enable the selected new gaming asset in the gaming application, based on the retrieved new NFT. The circuitry 202 may further disable the first gaming asset in the gaming application, based on the enabled new gaming asset.

In an embodiment, the circuitry 202 may further determine whether the first gaming asset is consumed by the player in the gaming application, based on the tracked set of gaming assets. The circuitry 202 may further update the tracked set of gaming assets, based on the determination that the first gaming asset is consumed. Herein, the super-fungible token 306A may be updated to exclude, from a set of NFTs (e.g., the set of NFTs 112) included in the super-fungible token 306A, a first NFT (e.g., the first NFT 112A) associated with the consumed first gaming asset. In an embodiment, the updated set of gaming assets may correspond to the set of second gaming assets.

In an embodiment, the circuitry 202 may be further configured to receive a fourth user input indicative of a selection of a fourth gaming asset from the updated set of gaming assets in the gaming application. The circuitry 202 may further retrieve, from the distributed ledger 108, a fourth NFT included in the updated super-fungible token, based on the selected fourth gaming asset. The circuitry 202 may further enable the selected fourth gaming asset in the gaming application, based on the retrieved fourth NFT. The circuitry 202 may further disable the first gaming asset in the gaming application, based on the enabled fourth gaming asset.

In an embodiment, the circuitry 202 may be further configured to receive a fifth user input indicative of an exchange of the first gaming asset with a fifth gaming asset in the gaming application. Herein, the fifth gaming asset may be excluded in the tracked set of gaming assets. The circuitry 202 may further update the tracked set of gaming assets, based on the received fifth user input. Herein, the updated set of gaming assets may include the fifth gaming asset and exclude the first gaming asset. The circuitry 202 may further create a fifth NFT associated with the fifth gaming asset, based on the updated set of gaming assets. The circuitry 202 may further update the super-fungible token 306A to further include the created fifth NFT and exclude a first NFT (e.g., the first NFT 112A) associated with the selected first gaming asset.

In an embodiment, the circuitry 202 may be further configured to enable the fifth gaming asset in the gaming application, based on the created fifth NFT. The circuitry 202 may further disable the first gaming asset in the gaming application, based on the enabled fifth gaming asset.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
    circuitry configured to:
        track a set of gaming assets associated with a player in a gaming application;
        receive metadata associated with the tracked set of gaming assets;
        create, based on the received metadata, a super-fungible token, wherein
            the super-fungible token is created based on a storage of the received metadata to a distributed ledger associated with the gaming application, and
            the creation of the super-fungible token corresponds to an ownership of a single gaming asset from the tracked set of gaming assets by the player in the gaming application at a time instant;
        receive a first user input indicative of a selection of a first gaming asset from the tracked set of gaming assets in the gaming application;
        enable the selected first gaming asset in the gaming application, based on the received first user input and on the created super-fungible token; and
        disable a set of second gaming assets of the tracked set of gaming assets in the gaming application, based on the enabled first gaming asset and on the created super-fungible token, wherein
            the disabled set of second gaming assets corresponds to gaming assets other than the enabled first gaming asset of the tracked set of gaming assets.

2. The electronic device according to claim 1, wherein each of the tracked set of gaming assets corresponds to at least one of a weapon, an avatar, a costume, an accessory, a power, a vehicle, an equipment, a gaming object, a character, a prop, a building, a player status, or a gaming tool.

3. The electronic device according to claim 1, wherein
    the created super-fungible token includes a set of non-fungible tokens (NFTs), and
    each NFT of the set of NFTs is associated with a corresponding gaming asset of the tracked set of gaming assets.

4. The electronic device according to claim 1, wherein the circuitry is further configured to:
    retrieve, from the distributed ledger, a first NFT of a set of NFTs included in the created super-fungible token, wherein
        the first NFT is retrieved based on the selected first gaming asset, and
        the selected first gaming asset is further enabled in the gaming application, based on the retrieved first NFT.

5. The electronic device according to claim 4, wherein the circuitry is further configured to:
    select the set of second gaming assets, based on the enabled first gaming asset; and
    retrieve, from the distributed ledger, a set of second NFTs of the set of NFTs included in the created super-fungible token, based on the selected set of second gaming assets, wherein
        the selected set of second gaming assets is disabled in the gaming application further based on the retrieved first NFT and the retrieved set of second NFTs.

6. The electronic device according to claim 4, wherein the circuitry is further configured to:
    receive a second user input indicative of a selection of a third gaming asset from the tracked set of gaming assets in the gaming application, wherein
        the third gaming asset is different from the first gaming asset;
    retrieve, from the distributed ledger, a third NFT of the set of NFTs included in the created super-fungible token, based on the selected third gaming asset, wherein
        the third NFT is different from the retrieved first NFT;
    enable the selected third gaming asset in the gaming application, based on the retrieved third NFT; and
    disable the first gaming asset in the gaming application, based on the enabled third gaming asset.

7. The electronic device according to claim 6, wherein the first gaming asset is further disabled based on the retrieved first NFT and the retrieved third NFT.

8. The electronic device according to claim 1, wherein the circuitry is further configured to:
    determine a new gaming asset acquired by the player in the gaming application, based on the tracked set of gaming assets;
    update the tracked set of gaming assets, based on the determined new gaming asset;
    receive updated metadata associated with the updated set of gaming assets;
    create a new NFT associated with the new gaming asset, based on the received updated metadata; and
    update the super-fungible token to further include the created new NFT.

9. The electronic device according to claim 8, wherein the updated set of gaming assets further includes the determined new gaming asset.

10. The electronic device according to claim 8, wherein the circuitry is further configured to:
    receive a third user input indicative of a selection of the new gaming asset from the updated set of gaming assets in the gaming application;
    retrieve, from the distributed ledger, the created new NFT included in the updated super-fungible token, based on the selected new gaming asset;
    enable the selected new gaming asset in the gaming application, based on the retrieved new NFT; and
    disable the first gaming asset in the gaming application, based on the enabled new gaming asset.

11. The electronic device according to claim 1, wherein the circuitry is further configured to:
    determine whether the first gaming asset is consumed by the player in the gaming application, based on the tracked set of gaming assets; and
    update the tracked set of gaming assets, based on the determination that the first gaming asset is consumed, wherein
        the super-fungible token is updated to exclude, from a set of NFTs included in the super-fungible token, a first NFT associated with the consumed first gaming asset.

12. The electronic device according to claim 11, wherein the updated set of gaming assets corresponds to the set of second gaming assets.

13. The electronic device according to claim 11, wherein the circuitry is further configured to:
receive a fourth user input indicative of a selection of a fourth gaming asset from the updated set of gaming assets in the gaming application;
retrieve, from the distributed ledger, a fourth NFT included in the updated super-fungible token, based on the selected fourth gaming asset;
enable the selected fourth gaming asset in the gaming application, based on the retrieved fourth NFT; and
disable the first gaming asset in the gaming application, based on the enabled fourth gaming asset.

14. The electronic device according to claim 1, wherein the circuitry is further configured to:
receive a fifth user input indicative of an exchange of the first gaming asset with a fifth gaming asset in the gaming application, wherein
the fifth gaming asset is excluded in the tracked set of gaming assets;
update the tracked set of gaming assets, based on the received fifth user input, wherein
the updated set of gaming assets includes the fifth gaming asset and excludes the first gaming asset;
create a fifth NFT associated with the fifth gaming asset, based on the updated set of gaming assets; and
update the super-fungible token to further include the created fifth NFT and exclude a first NFT associated with the selected first gaming asset.

15. The electronic device according to claim 14, wherein the circuitry is further configured to:
enable the fifth gaming asset in the gaming application, based on the created fifth NFT; and
disable the first gaming asset in the gaming application, based on the enabled fifth gaming asset.

16. A method, comprising:
in an electronic device:
tracking a set of gaming assets associated with a player in a gaming application;
receiving metadata associated with the tracked set of gaming assets;
creating, based on the received metadata, a super-fungible token, wherein
the super-fungible token is created based on a storage of the received metadata to a distributed ledger associated with the gaming application, and
the creation of the super-fungible token corresponds to an ownership of a single gaming asset from the tracked set of gaming assets by the player in the gaming application at a time instant;
receiving a first user input indicative of a selection of a first gaming asset from the tracked set of gaming assets in the gaming application;
enabling the selected first gaming asset in the gaming application, based on the received first user input and on the created super-fungible token; and
disabling a set of second gaming assets of the tracked set of gaming assets in the gaming application, based on the enabled first gaming asset and on the created super-fungible token, wherein
the disabled set of second gaming assets corresponds to gaming assets other than the enabled first gaming asset of the tracked set of gaming assets.

17. The method according to claim 16, wherein each of the tracked set of gaming assets corresponds to at least one of a weapon, an avatar, a costume, an accessory, a power, a vehicle, an equipment, a gaming object, a character, a prop, a building, a player status, or a gaming tool.

18. The method according to claim 16, wherein
the created super-fungible token includes a set of non-fungible tokens (NFTs), and
each NFT of the set of NFTs is associated with a corresponding gaming asset of the tracked set of gaming assets.

19. The method according to claim 16, further comprising:
retrieving, from the distributed ledger, a first NFT of a set of NFTs included in the created super-fungible token, wherein
the first NFT is retrieved based on the selected first gaming asset, and
the selected first gaming asset is further enabled in the gaming application, based on the retrieved first NFT.

20. A non-transitory computer-readable medium having stored thereon, computer-executable instructions that when executed by an electronic device, causes the electronic device to execute operations, the operations comprising:
tracking a set of gaming assets associated with a player in a gaming application;
receiving metadata associated with the tracked set of gaming assets;
creating, based on the received metadata, a super-fungible token, wherein
the super-fungible token is created based on a storage of the received metadata to a distributed ledger associated with the gaming application, and
the creation of the super-fungible token corresponds to an ownership of a single gaming asset from the tracked set of gaming assets by the player in the gaming application at a time instant;
receiving a first user input indicative of a selection of a first gaming asset from the tracked set of gaming assets in the gaming application;
enabling the selected first gaming asset in the gaming application, based on the received first user input and on the created super-fungible token; and
disabling a set of second gaming assets of the tracked set of gaming assets in the gaming application, based on the enabled first gaming asset and on the created super-fungible token, wherein
the disabled set of second gaming assets corresponds to gaming assets other than the enabled first gaming asset of the tracked set of gaming assets.

* * * * *